United States Patent
Higashi et al.

(10) Patent No.: US 10,332,548 B2
(45) Date of Patent: Jun. 25, 2019

(54) MAGNETIC RECORDING MEDIUM PROCESSING DEVICE AND METHOD OF GENERATING INTERFERENCE FIELD

(71) Applicant: NIDEC SANKYO CORPORATION, Suwa-gun Nagano (JP)

(72) Inventors: Katsuhisa Higashi, Nagano (JP); Ikuro Kuribayashi, Nagano (JP); Keiji Miyazawa, Nagano (JP); Yohei Shimizu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/019,977

(22) Filed: Jun. 27, 2018

(65) Prior Publication Data

US 2019/0005979 A1 Jan. 3, 2019

(30) Foreign Application Priority Data

Jun. 30, 2017 (JP) ................. 2017-128505

(51) Int. Cl.
*G06K 7/08* (2006.01)
*G11B 5/09* (2006.01)

(52) U.S. Cl.
CPC ..................... *G11B 5/09* (2013.01)

(58) Field of Classification Search
CPC .. G06K 7/084; G06K 7/087; G06K 19/06206; G06K 19/06196; G07F 19/20; G07F 19/2055; H04K 3/825; G11B 20/1816; G11B 5/3912; G11B 5/40; G11B 5/00813; G11B 5/3133; G11B 5/3106; G11B 5/455; G01N 3/56; G01R 27/18; G01R 33/1207

See application file for complete search history.

(56) References Cited

U.S. PATENT DOCUMENTS

2013/0062410 A1* 3/2013 Mitchell ............ G06K 13/0868
235/449
2013/0141141 A1* 6/2013 Yesil ....................... G07F 19/20
327/110

FOREIGN PATENT DOCUMENTS

JP 2014128175 A 7/2014
JP 2016014986 A 1/2016

* cited by examiner

*Primary Examiner* — Thien T Mai
(74) *Attorney, Agent, or Firm* — Cantor Colburn LLP

(57) ABSTRACT

A magnetic recording medium processing device may include a magnetic recording medium insertion slot; a medium pathway connected to the magnetic recording medium insertion slot; a magnetic head arranged to face the medium pathway; and an interference magnetic field generating device structured to generate interference magnetic fields outside the magnetic recording medium insertion slot. The interference magnetic field generating device may include a coil, a capacitor, a first power line, a second power line to which a voltage different from that to the first power line is applied, multiple switches structured to switch the connections between the first power line and the second power line of the coil and the capacitor, and a switch control unit structured to control the multiple switches.

4 Claims, 8 Drawing Sheets ns device and a method of generating interference magnetic fields in the magnetic recording medium processing device.

MAGNETIC RECORDING MEDIUM PROCESSING DEVICE AND METHOD OF GENERATING INTERFERENCE FIELD

CROSS REFERENCE TO RELATED APPLICATION

The present invention claims priority under 35 U.S.C. § 119 to Japanese Application No. 2017-128505 filed Jun. 30, 2017, the entire content of which is incorporated herein by reference.

FIELD OF THE TECHNOLOGY

At least an embodiment of the present invention relates to a technology of generating interference magnetic fields in a magnetic recording medium processing device which transfers a magnetic recording medium such as a card, on which magnetic information is recorded, and reads and writes magnetic information on the magnetic recording medium.

BACKGROUND

By mounting a magnetic head (a skimming head) outside an insertion slot through which a card is to be inserted to illegally acquire the magnetic information, a fraudulent act may be performed on a magnetic recording medium processing device, which normally takes in a card (a magnetic recording medium) having magnetic information recorded thereon, transfers the card along a transfer passage and reads or writes the magnetic information with a magnetic head arranged on the transfer passage. As a measure to prevent such fraudulent acts, an interference field generating device is used to generate an interference magnetic field in the area outside the insertion slot to interfere with the illegal reading of the magnetic information.

For such an interference field generating device, a technology has been proposed for generating an interference magnetic field by providing and oscillating a resonance circuit in which a coil and a capacitor are connected in parallel (referring to Patent Reference 1). Another technology has also been proposed in which an H-bridge circuit with coil is configured by switches such as a transistor; when a separately provided capacitor and a coil, which are different from the ones of the H-bridge circuit, are electrically connected in series, the drive voltage and the voltage charged in the capacitor are applied to the coil (referring to Patent Reference 2).

PATENT REFERENCE

[Patent Reference 1] Unexamined Japanese Patent Application 2016-014986 Publication
[Patent Reference 2] Unexamined Japanese Patent Application 2014-128175 Publication In the technology disclosed in Patent Reference 1, an interference magnetic field is generated by a parallel resonance caused between a coil and a capacitor. In the technology disclosed in Patent Reference 2, an interference magnetic field is generated by a series resonance caused between a coil and a capacitor. With the technology of Patent Reference 1 or 2, however, a fraudulent reading may still be performed since the interference magnetic fields are generated in the identical waveform which may be analyzed by a skimming head.

SUMMARY

Considering the above problem, at least an embodiment of the present invention is devised to provide a magnetic recording medium processing device which is capable of generating difficult-to-analyze interference magnetic fields and a method of generating interference magnetic fields in the magnetic recording medium processing device.

To solve the above problem, an magnetic recording medium processing device of at least an embodiment of the present invention comprises a magnetic recording medium insertion slot, a medium transfer passage connected to the magnetic recording medium insertion slot, a magnetic head arranged facing the medium transfer passage, and an interference magnetic field generating device for generating interference magnetic fields outside the magnetic recording medium insertion slot; wherein the interference magnetic field generating device has a coil, a capacitor, a first power line, a second power line to which a different voltage different from that to the first power line is applied, multiple switches to switch the connections between the first power line and the second power line of the coil and the capacitor, and a switch control unit which controls the multiple switches to first execute a first interference magnetic field generating mode, in which the coil and the capacitor are electrically connected in series between the first power line and the second power line, and then to oscillate the coil with the electric charge stored in the capacitor during the first interference magnetic field generating mode.

At least an embodiment of the present invention is also a method of generating interference magnetic fields used in a magnetic recording medium processing device, which has a magnetic recording medium insertion slot, a medium transfer passage connected with the magnetic recording medium insertion slot, for generating interference magnetic fields outside the magnetic recording medium insertion slot; it is characterized by the fact that the interference magnetic field generating device has a coil, a capacitor, a first power line, a second power line to which a voltage different from that to the first power line is applied, multiple switches to switch the connections between the first power line and the second power line of the coil and the capacitor, and a switch controller which controls the multiple switches to first execute the first interference magnetic field generating mode, in which the coil and the capacitor are electrically connected in series between the first power line and the second power line and then to oscillate the coil with electric charge stored in the capacitor during the first interference magnetic field generating mode.

In at least an embodiment of the present invention, the multiple switches are controlled by the switch control unit to implement the first interference magnetic field generating mode, in which the coil and the capacitor are electrically connected in series between the first power line and the second power line, and the second interference magnetic field generating mode, in which the coil is oscillated by the electric charge stored in the capacitor; therefore, different interference magnetic fields can be generated. Consequently, it becomes difficult for a skimming head to analyze the interference magnetic fields; accordingly, a fraudulent reading can easily be prevented.

In the magnetic recording medium processing device and the interference magnetic field generating method of at least an embodiment of the present invention, the multiple switches may include a first switch provided between a first connecting node, to which one end of the coil and one end of the capacitor are connected, and the second power line, a second switch provided between either the other end of the coil or the other end of the capacitor and the first power line, a third switch provided between either the other end of the coil or the other end of the capacitor and the second power line, and a fourth switch provided between another of either the other end of the coil or the other end of the capacitor and the second power line; the switch control unit may turn the first switch, the second switch and the fourth switch on and the third switch off to implement the first interference magnetic field generating mode, and may turn the third switch and the fourth switch on and the first switch and the second switch off to implement the second interference magnetic field generating mode.

In the magnetic recording medium processing device and the interference magnetic field generating method of at least an embodiment of the present invention, the multiple switches may include a fifth switch provided between another of either the other end of the coil or the other end of the capacitor and the first power line, and the switch control unit may turn the first switch, the third switch, and the fifth switch on and the second switch and the fourth switch off to implement a third interference magnetic field generating mode and then turns the third switch and the fourth switch on and the first switch, the second switch and the fifth switch off to implement a fourth interference magnetic field generating mode.

In at least an embodiment of the present invention, the multiple switches are controlled by the switch control unit to implement the first interference magnetic field generating mode, in which the coil and the capacitor are electrically connected in series between the first power line and the second power line, and the second interference magnetic field generating mode, in which the coil is oscillated by the electric charge stored in the capacitor, thus being able to generate different interference magnetic fields. Consequently, it becomes difficult for a skimming head to analyze the interference magnetic field, and accordingly, a fraudulent reading can easily be prevented.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which.

DETAILED DESCRIPTION

Figure 1A:
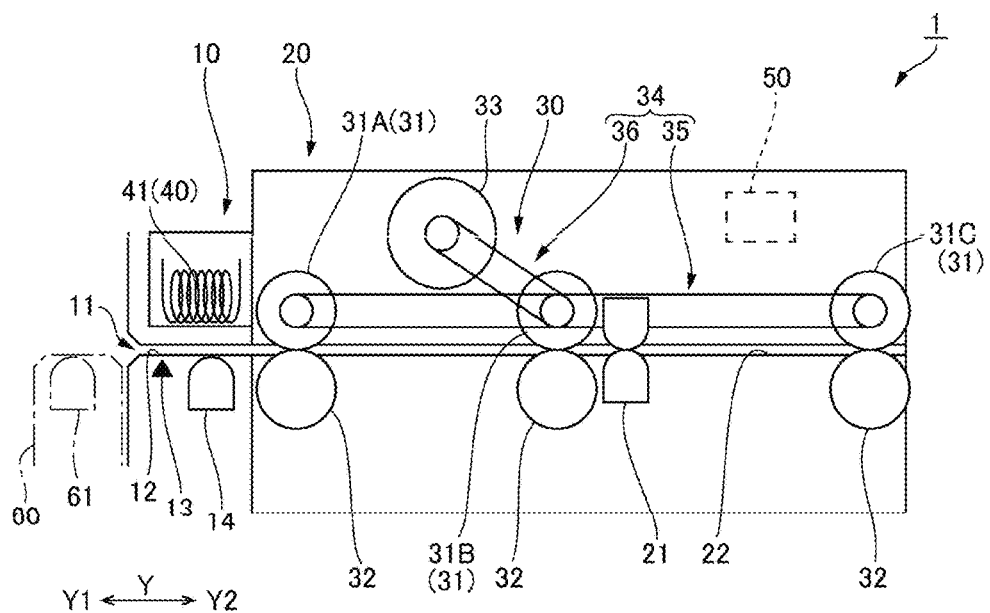
FIG. 1A and FIG. 1B are explanatory drawings schematically illustrating a magnetic recording medium processing device of an embodiment of the present invention.

Referring to the drawings, embodiments of the magnetic recording medium processing device to which the present invention is applied are described.

(Overall Configuration)

Figure 1B:
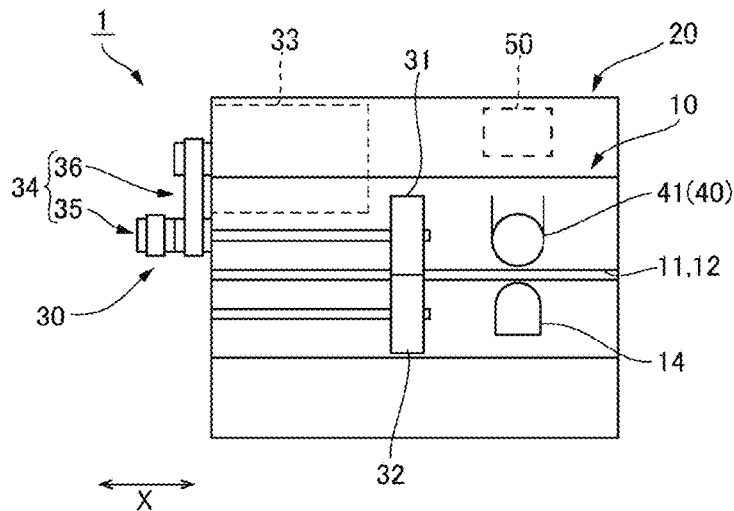

FIG. 1 is an explanatory drawing schematically illustrating a magnetic recording medium processing drive 1 of an embodiment of the present invention: FIG. 1A is a diagram of the magnetic recording medium processing device 1, viewed from the side; FIG. 1B is a diagram of the magnetic recording medium processing device 1, viewed from the front. Note that, in the description below, the X direction and the Y direction intersect perpendicularly with each other. The Y direction is the front-rear direction in which a transfer pathway 22 extends; one side in the Y direction is denoted as Y1 and the other side in the Y direction is denoted as Y2 in the description. The X direction is the width direction of the transfer pathway 22. FIG. 1B shows the arrangement of the components when the magnetic recording medium processing device is viewed from the front Y1.

The magnetic recording medium processing device 1 illustrated in FIG. 1 is a device for transferring a magnetic recording medium 2 such as a card, on which magnetic information is recorded, to either read the magnetic information recorded on the magnetic recording medium 2 or write magnetic information on the magnetic recording medium 2. The magnetic recording medium processing device 1 is mounted for use in an ATM (Automated Teller Machine), for example. The magnetic recording medium processing device 1 has a gate portion 10 and a device body 20 in which a magnetic head 21 is equipped. Inside the device body 20 is formed a transfer pathway 22 (a media passage) connected to the magnetic recording medium insertion slot 11, and the magnetic head 21 is arranged facing the transfer pathway 22. In the gate portion 10, a magnetic recording medium insertion passage 12 is formed to connect the magnetic recording medium insertion slot 11 with the transfer pathway 22. The device body 20 is equipped with a transfer device 30 for transferring the magnetic recording medium 2 along the transfer pathway 22.

The gate portion 10 protrudes from the front face of the device body 20 in the front Y1 direction. The magnetic recording medium insertion slot 11 is formed to the front face of the gate portion 10 and extends in the width direction X. The gate portion 10 is equipped with a detecting portion 13 and a pre-head 14 near the magnetic recording medium insertion slot 11. The detecting portion 13 is an insertion-detecting mechanism for detecting that a magnetic recording medium 2 is inserted. Used for the detecting portion 13 is a contact-type sensor, equipped with a detecting member which makes contact with the inserted magnetic recording medium 2, or an optical sensor. The pre-head 14 is a magnetic sensor for detecting that magnetic information is recorded on the inserted magnetic recording medium 2.

Inside the gate portion 10, an interference magnetic field generating device 40 is arranged to generate interference magnetic fields outside the magnetic recording medium insertion slot 11, that is, toward the front Y1 side of the magnetic recording medium insertion slot 11. The interference magnetic field generating device 40 is equipped with an interference magnetic field generating coil 411, which is described later. The interference magnetic field generating device 40 turns on or off the electric current to the coil 411 to generate or stop generating the interference magnetic field. Therefore, as shown by an alternate long and short dash line, a skimmer 60 equipped with a magnetic head 61 (a skimming head) is attached outside the magnetic recording medium insertion slot 11 so that, when a fraudulent action is to be performed to illegally acquire magnetic information, the fraudulent reading of the magnetic information can be prevented. The interference magnetic field generating device 40 generates an interference magnetic field at the level at which magnetic information recorded on a magnetic recording medium 2 won't be affected.

The transfer device 30 is equipped with transfer rollers 31 which make contact with and transfer a magnetic recording medium 2, pressing rollers 32 which press the magnetic recording medium 2 to the transfer rollers 31, a motor 33 as a drive source, and a drive force transmitting mechanism 34 which transmits the rotation of the motor 33 to the transfer rollers 31. The multiple transfer rollers 31 are arranged at a predetermined interval along the transfer pathway 22 in the front-rear direction Y. Each of the multiple transfer rollers 31 is opposed to a pressing roller 32 lining the transfer pathway 22. The drive force transmitting mechanism 34 is provided with a first belt mechanism 35 in which a belt is laid over pulleys attached to rotating shafts of the transfer rollers 31, and a second belt mechanism 36 which transmits the rotation of the motor 33 to one of the pulleys of the first belt mechanism 35. Note that the configuration of the drive force transmitting mechanism 34 is not necessarily the same as above and can be modified accordingly.

The multiple transfer rollers 31 include transfer rollers 31A, 31C and 31B. One of those rollers, the transfer roller 31A, positioned at the most front Y1 side, is arranged at the front end of the transfer pathway 22. On the Y2 side behind the transfer roller 31A, the transfer rollers 31B and 31C are arranged in this order. The magnetic head 21 is arranged between the transfer rollers 31B and 31C. Note that the number of the transfer rollers 31 does not need to be three and the arrangement is not limited to the one shown in FIG. 1A, either. Also, the transfer device 30 may adopt a mechanism different from the transfer rollers. For example, a magnetic recording medium 2 can be transferred by a belt mechanism. The transfer device 30 can change the transfer direction or the transfer speed of the magnetic recording medium 2 by controlling the rotation direction and the rotation speed of the motor 33.

(Control System)

The magnetic recording medium processing device 1 is equipped with a control unit for controlling the magnetic head 1, the transfer device 30 and the interference magnetic field generating device 40. When the output of the detecting unit 13 and the pre-head 40 is input to the control unit 50, the control unit 50 controls the transfer device 30 and the interference magnetic field generating device 40 to take a magnetic recording medium 2 into the transfer pathway 22 or to discharge the magnetic recording medium 2 from the transfer pathway 22. For example, when the output of the detecting unit 13 shows the switch from the signal indicating no presence of a magnetic recording medium to the signal indicating the presence of the magnetic recording medium, the control unit starts driving the motor 33 of the transfer device 30 at the speed of slow speed rotation to start transferring the magnetic recording medium 2, and also starts electrifying the coil 411 of the interference magnetic field generating device 40 to generate an interference magnetic field.

Note that, since magnetic information recorded on a magnetic recording medium 2 is detected by the pre-head 14 in this embodiment, the control unit 50 can also start transferring the magnetic recording medium 2 and electrifying the coil 411 based on the output of the pre-head 14. In this configuration, there is no need to provide the detecting unit 13, and an interference magnetic field can be generated only when the inserted magnetic recording medium 2 is a magnetic card.

(Configuration of Interference Magnetic Field Generating Device 40)

Figure 2:
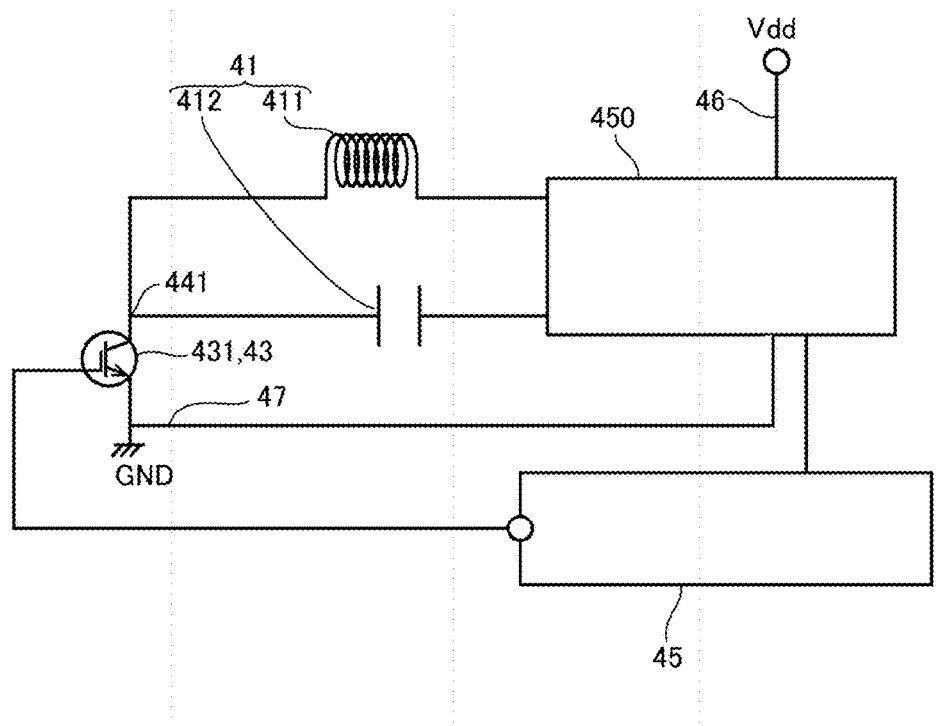
FIG. 2 is an explanatory drawing of the configuration of an interference magnetic field generating device installed in the magnetic recording medium processing device illustrated in FIG. 1A and FIG. 1B.
Figure 3:
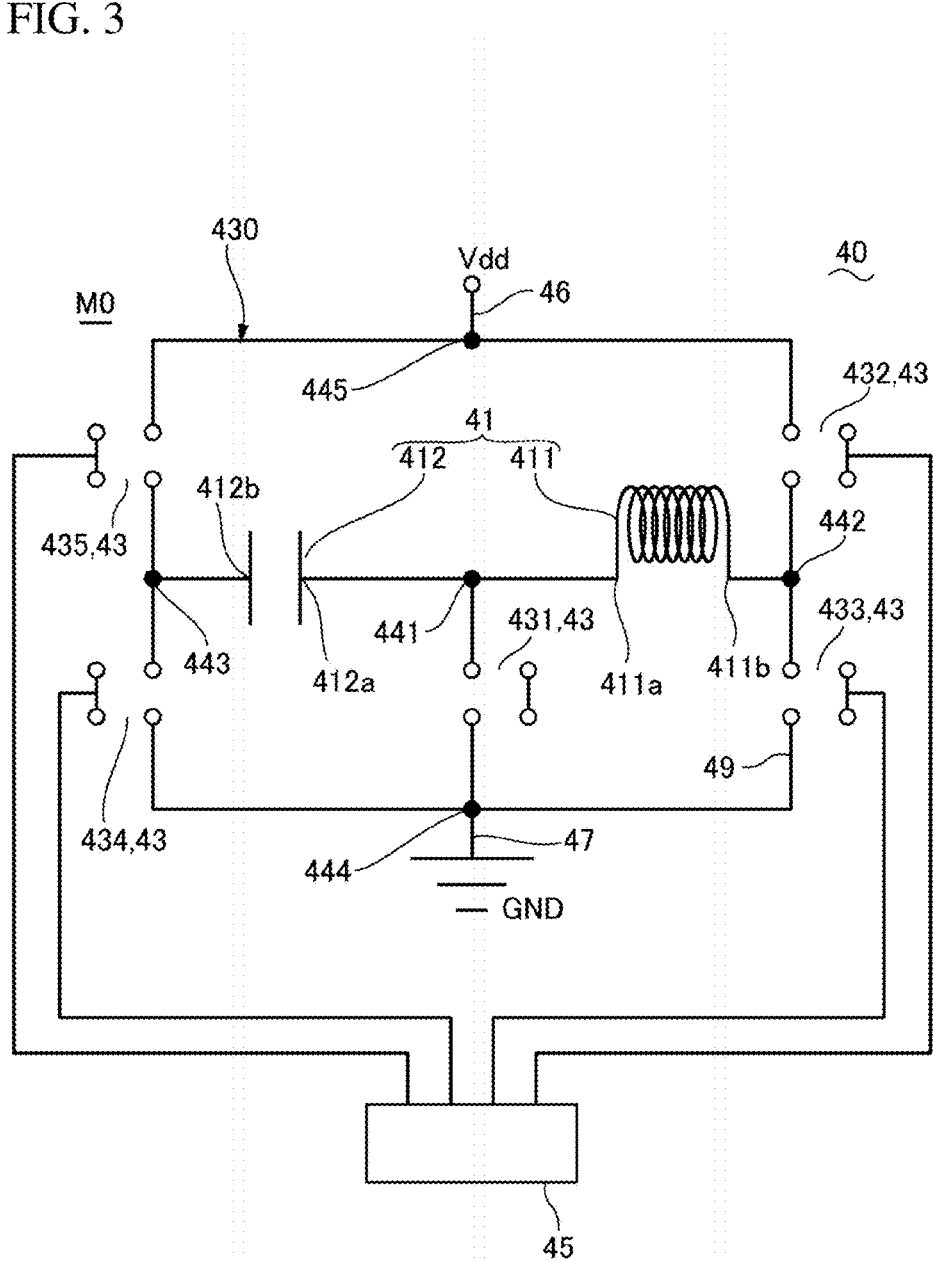
FIG. 3 is another explanatory drawing of the configuration of the interference magnetic field generating device installed in the magnetic recording medium processing device illustrated in FIG. 1A and FIG. 1B.

FIG. 2 is an explanatory diagram showing the configuration of the interference magnetic field generating device 40 provided in the magnetic recording medium processing device 1 shown in FIG. 1. FIG. 3 is an explanatory diagram of the circuit configuration in the interference magnetic field generating device 40 shown in FIG. 1.

As shown in FIG. 2 and FIG. 3, the interference magnetic field generating device 40 has an oscillation circuit 41 configured by the coil 411 and the capacitor 412, a first power line 46, a second power line 47 to which a voltage different from that to the first power line 46 is applied, multiple switches 43 for switching the connections among the first power line 46, the second power line 47 and the oscillation circuit 41 (the coil 411 and the capacitor 412). A driving voltage Vdd from a DC power circuit (no illustration) is applied to the first power line 46, and the second power line 47 is electrically connected to a GND. The coil 411 is configured by a winding coil or has the structure in which a coil wire is wound around an iron core.

In this embodiment, the switch control unit 45 controls the multiple switches 43, which will be described later referring to FIG. 4 and FIG. 6, to first implement a first interference magnetic field generating mode M1, in which the coil 411 and the capacitor 412 are electrically connected in series between the first power line 46 and the second power line 47, and then implement a second interference magnetic field generating mode M2, in which the charge stored in the capacitor 412 during the first interference magnetic field generating mode M1 is released to drive the coil 411. Also, the switch control unit 45 controls the multiple switches 43, which will be described later referring to FIG. 5 and FIG. 6, to first implement a third interference magnetic field generating mode M3, in which the coil 411 and the capacitor 412 are electrically connected in series between the first power line 46 and the second power line 47 in a reverse-polarity to the first interference magnetic field generating mode M1, and then implement a fourth interference magnetic field generating mode M4, in which the charge stored in the capacitor 412 during the third interference magnetic field generating mode M3 is released to drive the coil 411.

In this embodiment, the multiple switches 43 includes a first switch 431, a second switch 432, a third switch 433, a fourth switch 434 and a fifth switch 435. In this embodiment, the second switch 432, the third switch 433, the fourth switch 434 and the fifth switch 435 are arranged on a drive IC 450; the first switch 431 is externally connected. Therefore, the switch control unit 45 controls the drive IC 450 and the first switch 431.

All the second switch 432, the third switch 433, the fourth switch 434 and the fifth switch 435 are composed of bipolar transistors, etc.; the switch control unit 45 controls the control signals which are applied to the bases of the bipolar transistors in the drive IC 450. The first switch 431 is an insulated gate bipolar transistor (IGBT) in which a field effect transistor is built in the base thereof; the switch control unit 5 controls the control signals which are applied to a MOS electrode of the field effect transistor. The first switch 431 has a larger ON resistance than the second switch 432, the third switch 433, the fourth switch 434 or the fifth switch 435.

The first switch 431 is provided between a first connection node 411, to which one end 411*a* of the coil 411 and one end of the capacitor 412 are connected, and the second power line 47. The second switch 432 is provided between either the other end 411*b* of the coil 411 or the other end 412*b* of the capacitor 412 and the first power line 46. The third switch 433 is provided between either the other end 411*b* of the coil 411 or the other end 412*b* of the capacitor 412 and the second power line 47. The fourth switch 434 is provided between another of either the other end 411*b* of the coil 411 or the other end 412*b* of the capacitor 412 and the second power line 47. The fifth switch 435 is provided between another of either the other end 411*b* of the coil 411 or the other end 412*b* of the capacitor 412 and the first power line 46.

In this embodiment, the second switch 432 is provided between the other end 411*b* of the coil 411 and the first power line 46. The third switch 433 is provided between the other end 411*b* of the coil 411 and the second power line 47. The fourth switch 434 is provided between the other end 412*b* of the capacitor 412 and the second power line 47. The fifth switch 435 is provided between the other end 412*b* of the capacitor 412 and the first power line 46.

Therefore, the other end 411*b* of the coil 411 is connected to a second connection node 442 to which the second switch 432 and the third switch 433 are connected, and the other end 412*b* of the capacitor 412 is connected to a third connection node 443 to which the fourth switch 434 and the fifth switch 435 are connected. In other words, provided between the first power line 46 and the second power line 47 is an H bridge circuit 430 having the second switch 432, the third switch 433, the fourth switch 434 and the fifth switch 435. Also, the second power line 47 is connected to a fourth connection node 444 to which the third switch 433 and the fourth switch 434 are connected; the first switch 431 is provided between the first connection node 411 and the fourth connection node 444. Also, to the fifth connection node 445 to which the second switch 432 and the fifth switch 435 are connected, the first power line 46 is connected.

(Operation)

Figure 4A:
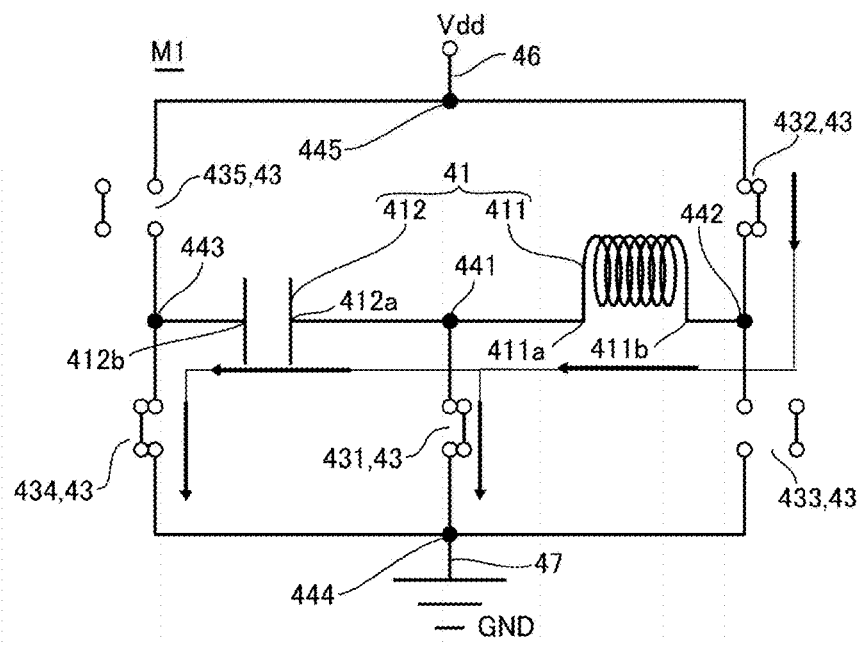
FIG. 4A and FIG. 4B are explanatory drawings of a current flow in the interference magnetic field generating device shown in FIG. 3.
Figure 4B:
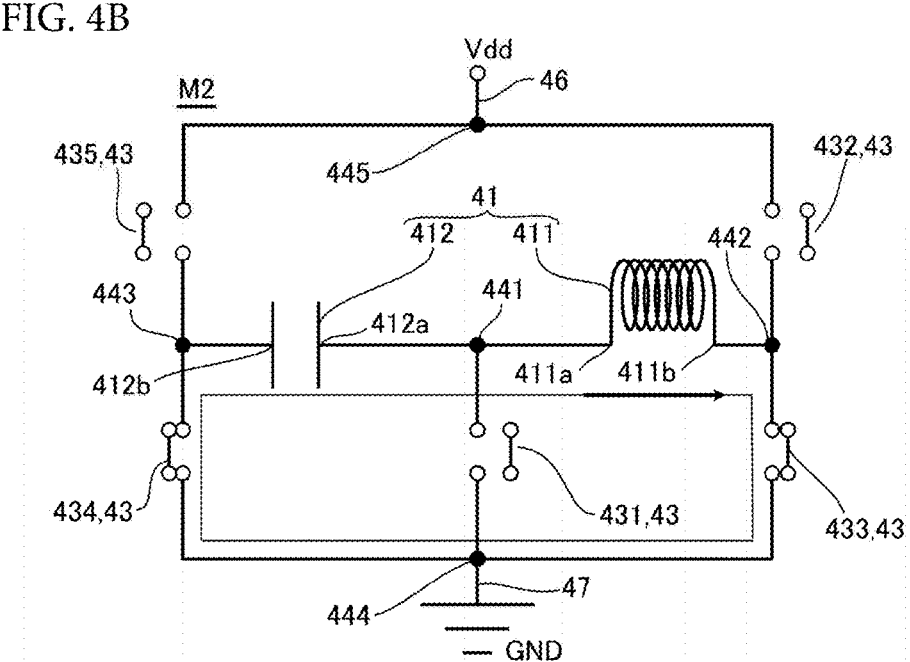
Figure 5A:
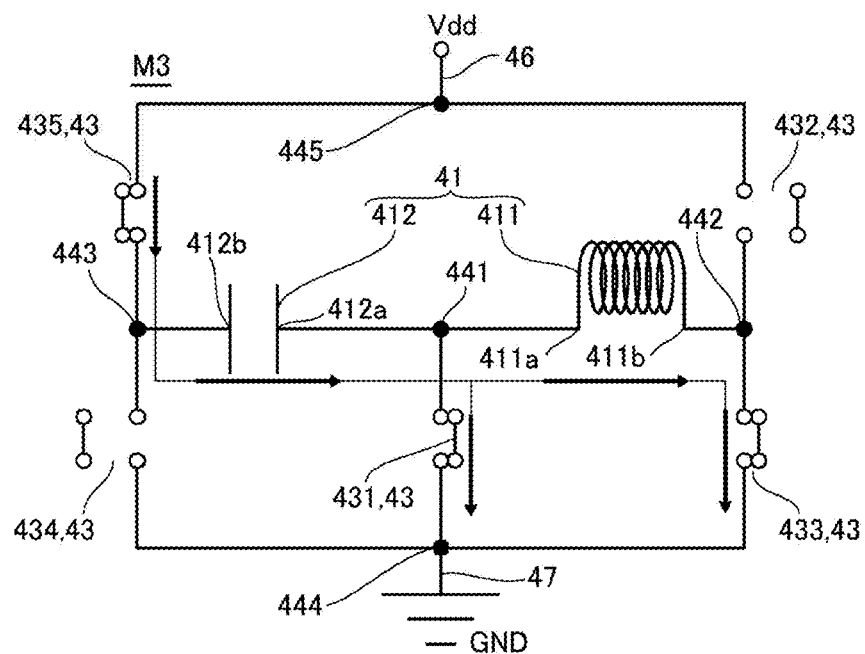
FIG. 5A and FIG. 5B are explanatory drawings of another current flow in the interference magnetic field generating device shown in FIG. 3.
Figure 5B:
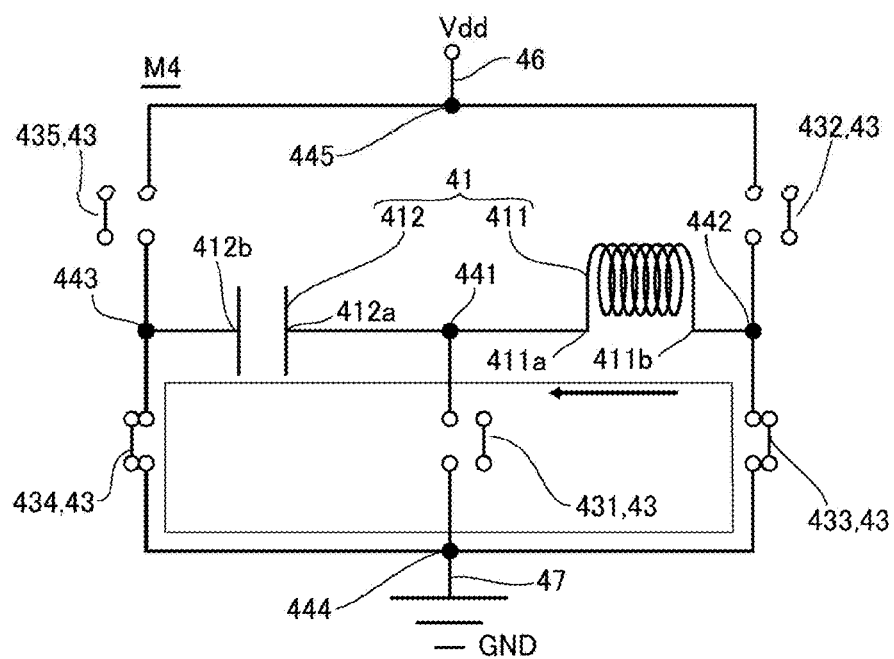

FIG. 4 is an explanatory diagram showing the current passage of the interference magnetic field generating device 40 shown in FIG. 3. FIG. 4A and FIG. 4B are respectively an explanatory diagram of the first interference magnetic field generating mode M1 and an explanatory diagram of the second interference magnetic field generating mode M2. FIG. 5 is an explanatory diagram showing another current passage of the interference magnetic field generating device 40 shown in FIG. 3: FIG. 5A and FIG. 5B are respectively an explanatory diagram of the third interference magnetic field generating mode M3 and an explanatory diagram of the fourth interference magnetic field generating mode M4. FIG. 6 is an explanatory diagram of the operation of the interference magnetic field generating device 40 of FIG. 3, showing the on/off status of the switch 4.

Figure 6:
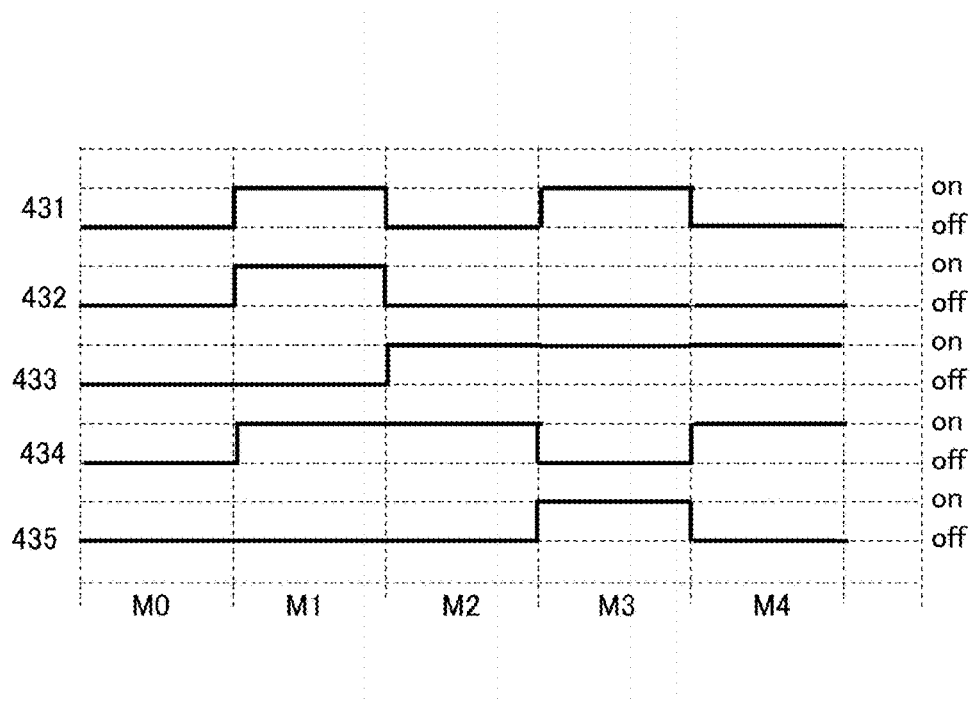
FIG. 6 is an explanatory drawing of the operation of the interference magnetic field generating device shown in FIG. 3.

In the magnetic recording medium processing device 1 of this embodiment, the switch control unit 45 turns the first switch 431, the second switch 432, the third switch 433, the fourth switch 434 and the fifth switch 435 off during the rest time M0 during which no magnetic recording medium 2 is inserted, as shown in FIG. 3 and FIG. 6.

When a magnetic recording medium 2 is inserted, the control unit 50 commands the interference magnetic field generating device 40 to generate an interference magnetic field, based on the output of the detection unit 13 or the output of the pre-head 14. According to this command, the switch control unit 45 turns the first switch 431, the second switch 432 and the fourth switch 434 on and turns the third switch 433 and the fifth switch 435 off to implement the first interference magnetic field generating mode M1 for which the coil 411 and the capacitor 412 are electrically connected in series between the first power line 46 and the second power line 47. In the first interference magnetic field generating mode M1, a first magnetic interference magnetic field is generated and the capacitor 412 is charged due to the difference between the on-resistance of the first switch 431 and the on-resistance of the fourth switch 434.

Next, the switch control unit 45 turns the third switch 433 and the fourth switch 434 on and turns the first switch 431, the second switch 432 and the fifth switch 435 off as shown in FIG. 4B and FIG. 6 to implement the second interference magnetic field generating mode M2. In the second interference magnetic field generating mode M2, the charge stored in the capacitor 412 is used to drive the coil 411 to generate a second interference magnetic field which is different from that of the first interference magnetic field generating mode M1. Thus, the different magnetic fields are generated in the first interference magnetic field generating mode M1 and in the second interference magnetic field generating mode M2. As a result, it is difficult to analyze the interference magnetic fields with a skimming head, and a fraudulent reading can easily be prevented.

In this embodiment, the switch control unit 45 turns the first switch 431, the third switch 433 and the fifth switch 435 on and turns the second switch 432 and the fourth switch 434 off, as shown in FIG. 5A and FIG. 6, to implement the third interference magnetic field generating mode M3 for which the coil 411 and the capacitor 412 are electrically connected in series between the first power line 46 and the second power line 47. In the third interference magnetic field generating mode M3, the coil 411 and the capacitor 412 are driven in reverse polarity to the first interference magnetic field generating mode M1 to generate a third interference magnetic field. In the third interference magnetic field generating mode M3, the capacitor 412 is charged due to the difference between the on-resistance of the first switch 431 and the on-resistance of the third switch 433.

Next, the switch control unit 45 turns the third switch 433 and the fourth switch 434 on the turns the first switch 431, the second switch 432 and the fifth switch 435 off, as shown in FIG. 5B and FIG. 6, to implement the fourth interference magnetic field generating mode M4. In the fourth interference magnetic field generating mode M4, the coil 411 is driven by the charge stored in the capacitor 412 to generate a fourth interference magnetic field which is different from that of the third interference magnetic field generating mode M3. Therefore, it becomes difficult for a skimming head to analyze the interference magnetic fields, and therefore, a fraudulent reading can easily be prevented.

Figure 7:
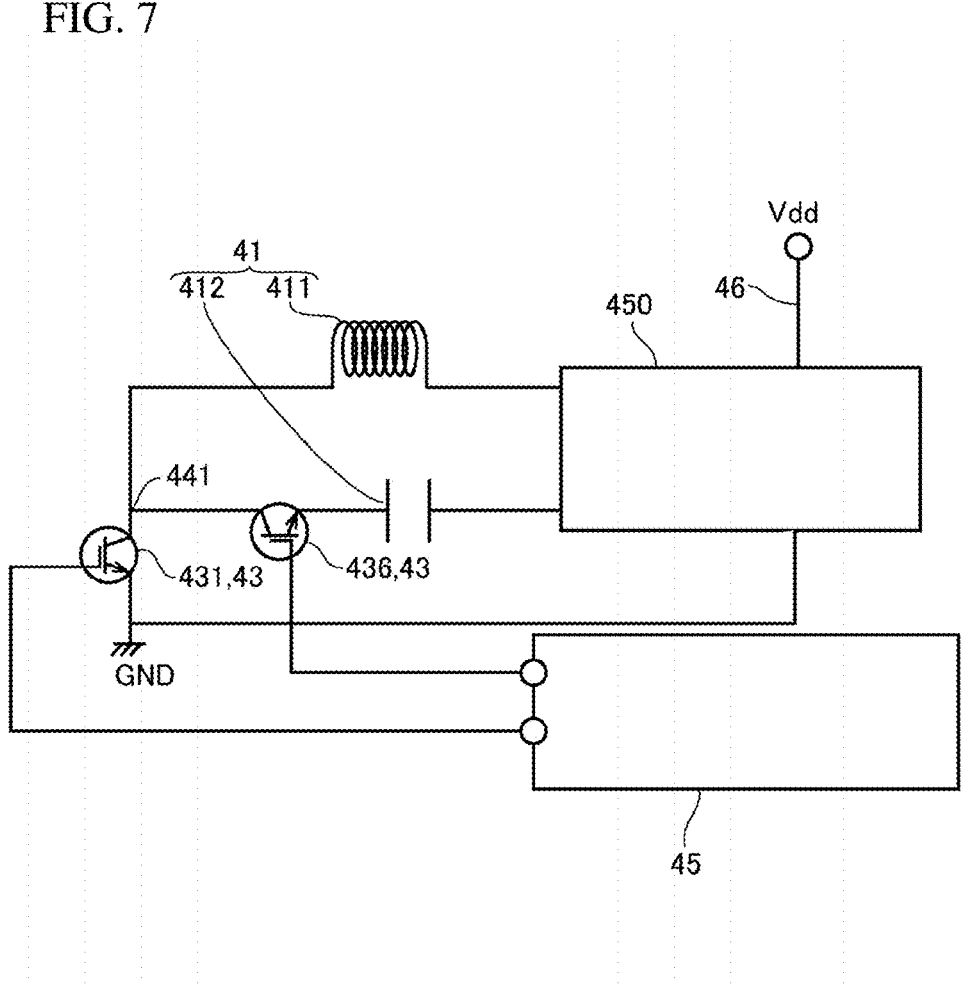
FIG. 7 is an explanatory drawing showing a variation of the interference magnetic field generating device in the magnetic recording medium processing device shown in FIG. 1A and FIG. 1B.
Figure 8:
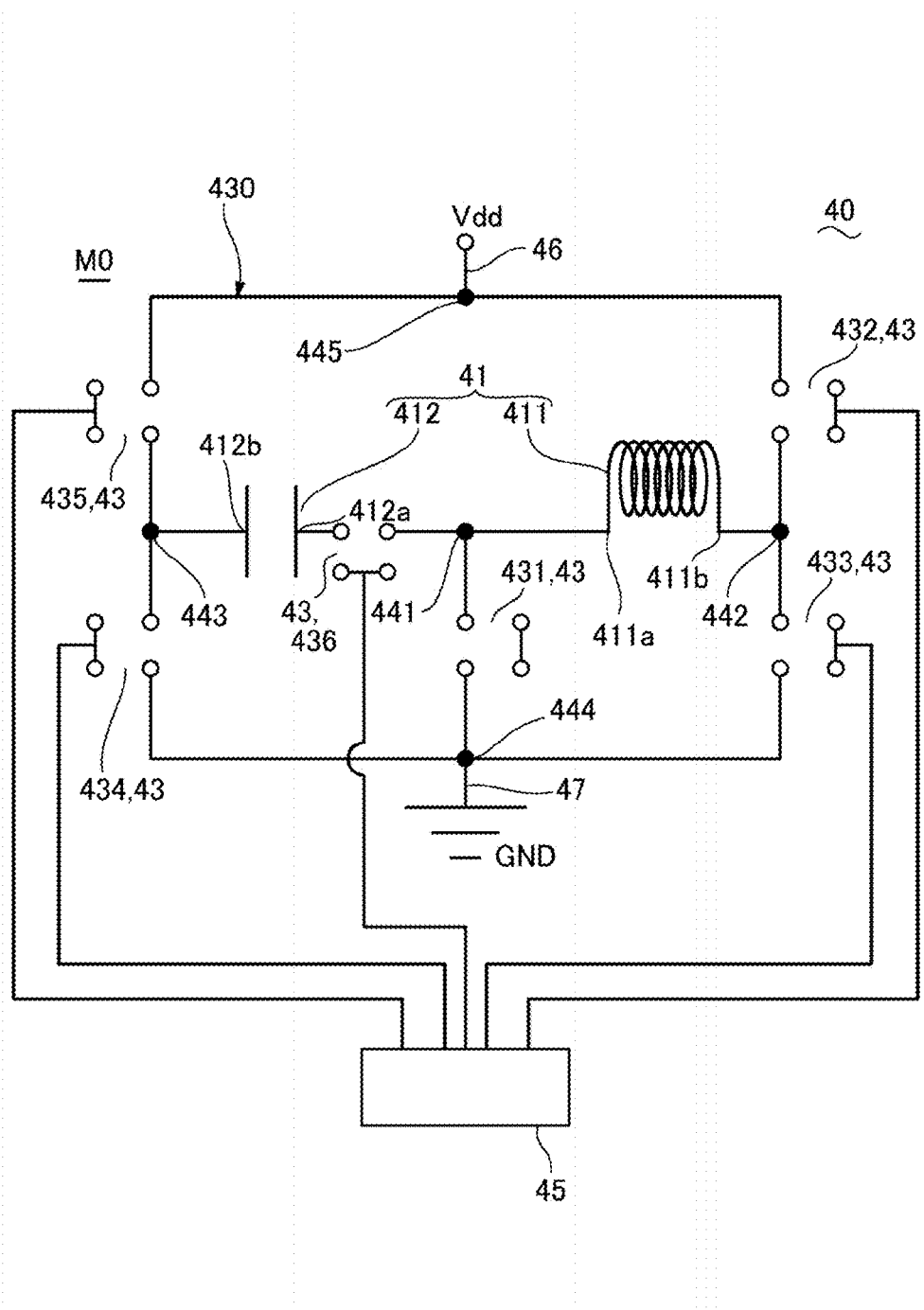
FIG. 8 is an explanatory drawing of a circuit configuration of the interference magnetic field generating device shown in FIG. 7.

Example of Another Configuration of Interference Magnetic Field Generating Portion FIG. 7 is an explanatory diagram of an example of a variation of the interference magnetic field generating device 40 provided in the magnetic recording medium processing device 1 shown in FIG. 1. FIG. 8 is an explanatory diagram showing the circuit configuration in the interference magnetic field generating device 40 shown in FIG. 7. Note that, since the basic configuration in this embodiment is the same as that in the above-described embodiment, the same codes are given to the common portions and the explanations of those portions are omitted.

As shown in FIG. 7 and FIG. 8, a sixth switch 436 is provided between the first connection node 441 of the coil 411 and the capacitor 412 and one end 412a of the capacitor 412 in this embodiment. Therefore, the sixth switch 436 is opened/closed at a predetermined timing before the first interference magnetic field generating mode M1, which is described referring to FIG. 4A, is implemented, to implement a mode, etc. for supplying current only to the coil 411 before the first interference magnetic field generating mode M1.

Another Embodiment

The above-described embodiment is one possible embodiment of the present invention; however, the present invention is not limited to this embodiment, but can be varyingly modified within the scope of the invention. For example, in the above-described embodiment, interference magnetic fields are generated when a magnetic recording medium 2 is inserted; however, interference magnetic fields may be generated when a magnetic recording medium 2 is inserted as well as when it is discharged.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A magnetic recording medium processing device, comprising:
   a magnetic recording medium insertion slot;
   a medium pathway connected to said magnetic recording medium insertion slot;
   a magnetic head arranged to face said medium pathway; and
   an interference magnetic field generating device structured to generate interference magnetic fields outside said magnetic recording medium insertion slot;
   wherein said interference magnetic field generating device comprises:
     a coil,
     a capacitor,
     a first power line,
     a second power line to which a voltage different from that to said first power line is applied, multiple switches structured to switch the connections between said first power line and said second power line of said coil and said capacitor, and
     a switch control unit structured to control said multiple switches to first implement a first interference magnetic field generating mode for which said coil and said capacitor are electrically connected in series between said first power line and said second power line and then to implement a second interference magnetic field generating mode for which said coil is oscillated by the charge stored in said capacitor during said first interference magnetic field generating mode;
   wherein said multiple switches comprises:
     a first switch provided between a first connection node, to which one end of said coil and one end of said capacitor are connected, and said second power line,
     a second switch provided between either the other end of said coil or the other end of said capacitor and said first power line,
     a third switch provided between either the other end of said coil or the other end of said capacitor and said second power line, and
     a fourth switch provided between another of either said other end of said coil or said other end of said capacitor and said second power line, and
   said switch control unit is structured to turn said first switch, said second switch and said fourth switch on and said third switch off to implement said first interference magnetic field generating mode, and turn said third switch and said fourth switch on and said first switch and said second switch off to implement said second interference magnetic field generating mode.

2. The magnetic recording medium processing device as set forth in claim 1
   wherein
   said multiple switches further comprises a fifth switch provided between another of either said other end of said coil or said other end of said capacitor and said first power line, and
   said switch control unit is structured to turn said first switch, said third switch and said fifth switch on and said second switch and said fourth switch off to implement a third interference magnetic field generating mode, and turn said third switch and fourth switch on and said first switch, said second switch and said fifth switch off to implement a fourth interference magnetic field generating mode.

3. An interference magnetic field generating method, used in a magnetic recording medium processing device which has a magnetic recording medium insertion slot, a medium pathway connected to said magnetic recording medium insertion slot, and a magnetic head arranged to face said medium pathway, for generating interference magnetic fields outside said magnetic recording medium insertion slot, the method comprising:
   providing a coil, a capacitor, a first power line, a second power line to which a voltage different from that to said first power line is applied, multiple switches used to switch the connections between said coil and said capacitor and said first power line and said second power line, and a switch control unit which controls said multiple switches; and
   controlling, with said switch control unit, said multiple switches to first implement a first interference magnetic field generating mode for which said coil and said capacitor are electrically connected in series between said first power line and said second power line and then to implement a second interference magnetic field generating mode for which said coil is oscillated by the charge stored in said capacitor during said first interference magnetic field generating mode;
   wherein said multiple switches comprises a first switch provided between a first connection node, to which one end of said coil and one end of said capacitor are connected, and said second power line, a second switch provided between either the other end of said coil or the other end of said capacitor and said first power line, a third switch provided between either the other end of said coil or the other end of said capacitor and said second power line, and a fourth switch provided between another of either said other end of said coil or said other end of said capacitor and said second power line, and the method further comprises turning, with said switch control unit, said first switch, said second switch and said fourth switch on and said third switch off to implement said first interference magnetic field generating mode, and then turning, with said switch control unit, said third switch and said fourth switch on and said first switch and said second switch off to implement said second interference magnetic field generating mode.

4. The interference magnetic field generating method as set forth in claim 3, wherein said multiple switches further comprises a fifth switch provided between another of either said other end of said coil or said other end of said capacitor and said first power line, and the method further comprises turning, with said switch control unit, said first switch, said third switch and said fifth switch on and said second switch and said fourth switch off to implement a third interference magnetic field generating mode, and then turning, with said switch control unit, said third switch and said fourth switch on and said first switch, said second switch and said fifth switch off to implement a fourth interference magnetic field generating mode.

* * * * *